US012730596B2

(12) United States Patent
Miyoshi et al.

(10) Patent No.: US 12,730,596 B2
(45) Date of Patent: Sep. 8, 2026

(54) INFORMATION PROCESSING APPARATUS, CONTROL METHOD THEREOF, AND MEDIUM AND PRINTING SYSTEM THEREOF

(71) Applicant: CANON KABUSHIKI KAISHA, Tokyo (JP)

(72) Inventors: Tomoya Miyoshi, Tokyo (JP); Minoru Fujisawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 18/467,029

(22) Filed: Sep. 14, 2023

(65) Prior Publication Data

US 2024/0118847 A1 Apr. 11, 2024

(30) Foreign Application Priority Data

Oct. 5, 2022 (JP) ................................ 2022-161206

(51) Int. Cl.
*G06F 3/12* (2006.01)

(52) U.S. Cl.
CPC .......... *G06F 3/1253* (2013.01); *G06F 3/1205* (2013.01); *G06F 3/1288* (2013.01); *G06F 3/1292* (2013.01)

(58) Field of Classification Search
CPC .... G06F 3/1253; G06F 3/1205; G06F 3/1288; G06F 3/1292; G06F 3/1204;
(Continued)

(56) References Cited

U.S. PATENT DOCUMENTS 8,675,234 B2 3/2014 Sato
10,990,334 B2 4/2021 Kaneda et al.
(Continued)

FOREIGN PATENT DOCUMENTS

JP H09258927 A 10/1997
JP 2012133489 A 7/2012
(Continued)

OTHER PUBLICATIONS

Extended European Search Report issued in European Appln. No. 23197290.2 mailed Feb. 6, 2024.

*Primary Examiner* — Darryl V Dottin
(74) *Attorney, Agent, or Firm* — ROSSI, KIMMS & McDOWELL LLP

(57) ABSTRACT

An information processing apparatus configures a virtual printer associated with one or a plurality of image forming apparatuses, manages capability information indicating a capability of each of the one or a plurality of image forming apparatuses associated with the virtual printer, determines, when a print job for the virtual printer is received, whether or not the print job is a conditional print job to be executed by an image forming apparatus that satisfies a predetermined condition, references, in a case where the print job is determined to be the conditional print job, the capability information and specifies an image forming apparatus that satisfies the predetermined condition from among the one or a plurality of image forming apparatuses, and transmits the conditional print job to an image forming apparatus that satisfies the predetermined condition.

20 Claims, 11 Drawing Sheets

(58) Field of Classification Search
CPC ...... G06F 3/1224; G06F 3/1226; G06F 3/122; G06F 3/1242; G06F 3/1279; G06F 3/1285; G06F 3/126; G06F 3/1259
See application file for complete search history.

(56) References Cited

U.S. PATENT DOCUMENTS

| | | | | |
|---|---|---|---|---|
| 2020/0089440 | A1 | 3/2020 | Takeo et al. | |
| 2020/0089443 | A1* | 3/2020 | Kashiwagi | G06F 3/1288 |
| 2020/0364010 | A1 | 11/2020 | Inoue | |
| 2020/0379689 | A1* | 12/2020 | Arai | G06F 3/1231 |
| 2020/0387332 | A1* | 12/2020 | Tokuda | G06F 3/1218 |
| 2020/0401357 | A1* | 12/2020 | Hirakawa | G06F 3/1204 |

FOREIGN PATENT DOCUMENTS

| | | | |
|---|---|---|---|
| JP | 2016126444 | A | 7/2016 |
| JP | 2020035233 | A | 3/2020 |
| JP | 2020194508 | A | 12/2020 |
| JP | 2021064210 | A | 4/2021 |
| KR | 1020200132690 | A | 11/2020 |
| KR | 1020200138061 | A | 12/2020 |

* cited by examiner

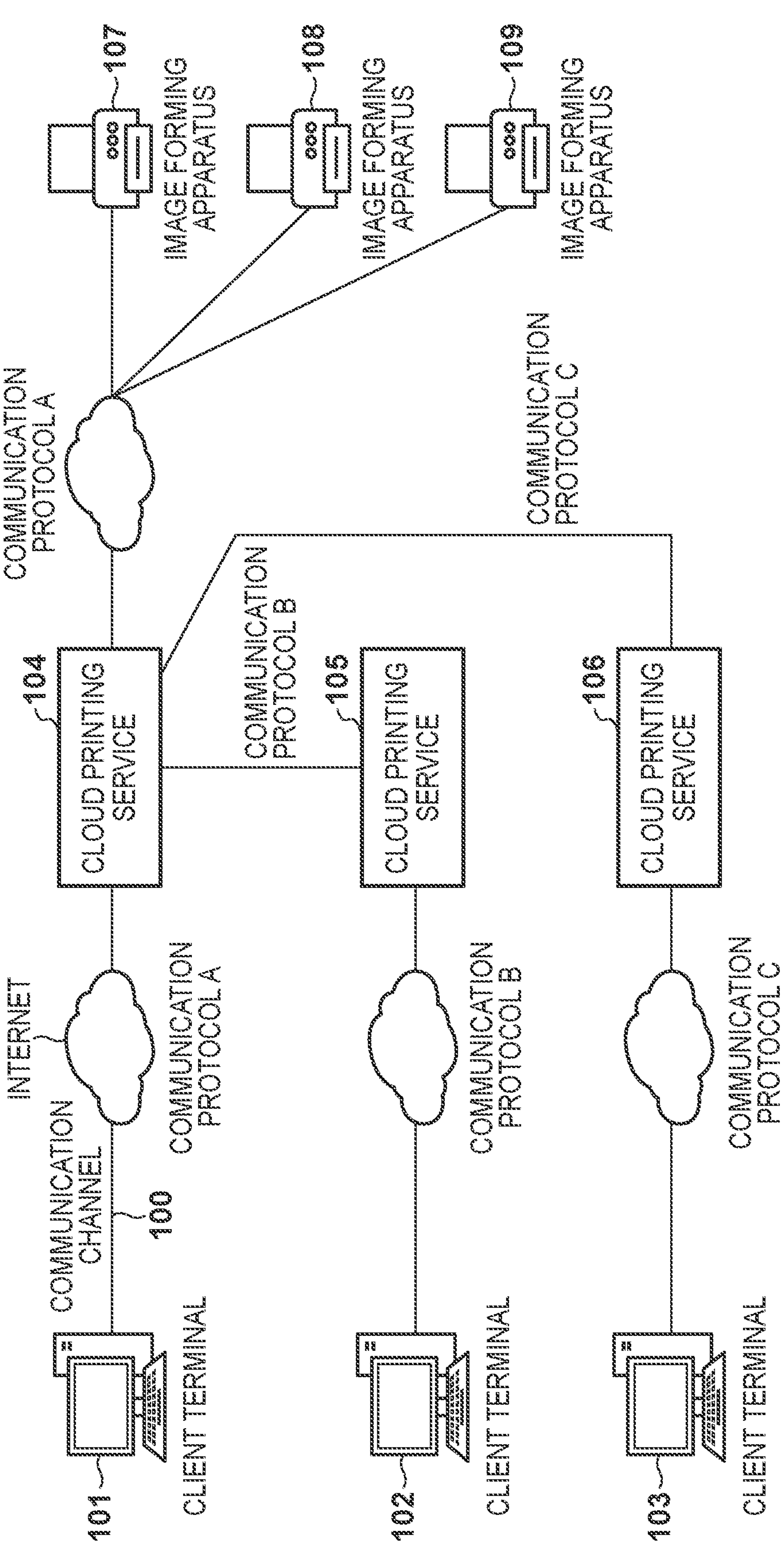
F I G. 1
101
CLIENT TERMINAL
102
CLIENT TERMINAL
103
CLIENT TERMINAL
COMMUNICATION CHANNEL
100
INTERNET
COMMUNICATION PROTOCOL A
COMMUNICATION PROTOCOL B
COMMUNICATION PROTOCOL C
104
CLOUD PRINTING SERVICE
105
CLOUD PRINTING SERVICE
106
CLOUD PRINTING SERVICE
COMMUNICATION PROTOCOL B
COMMUNICATION PROTOCOL A
COMMUNICATION PROTOCOL C
107
IMAGE FORMING APPARATUS
108
IMAGE FORMING APPARATUS
109
IMAGE FORMING APPARATUS

FIG. 4

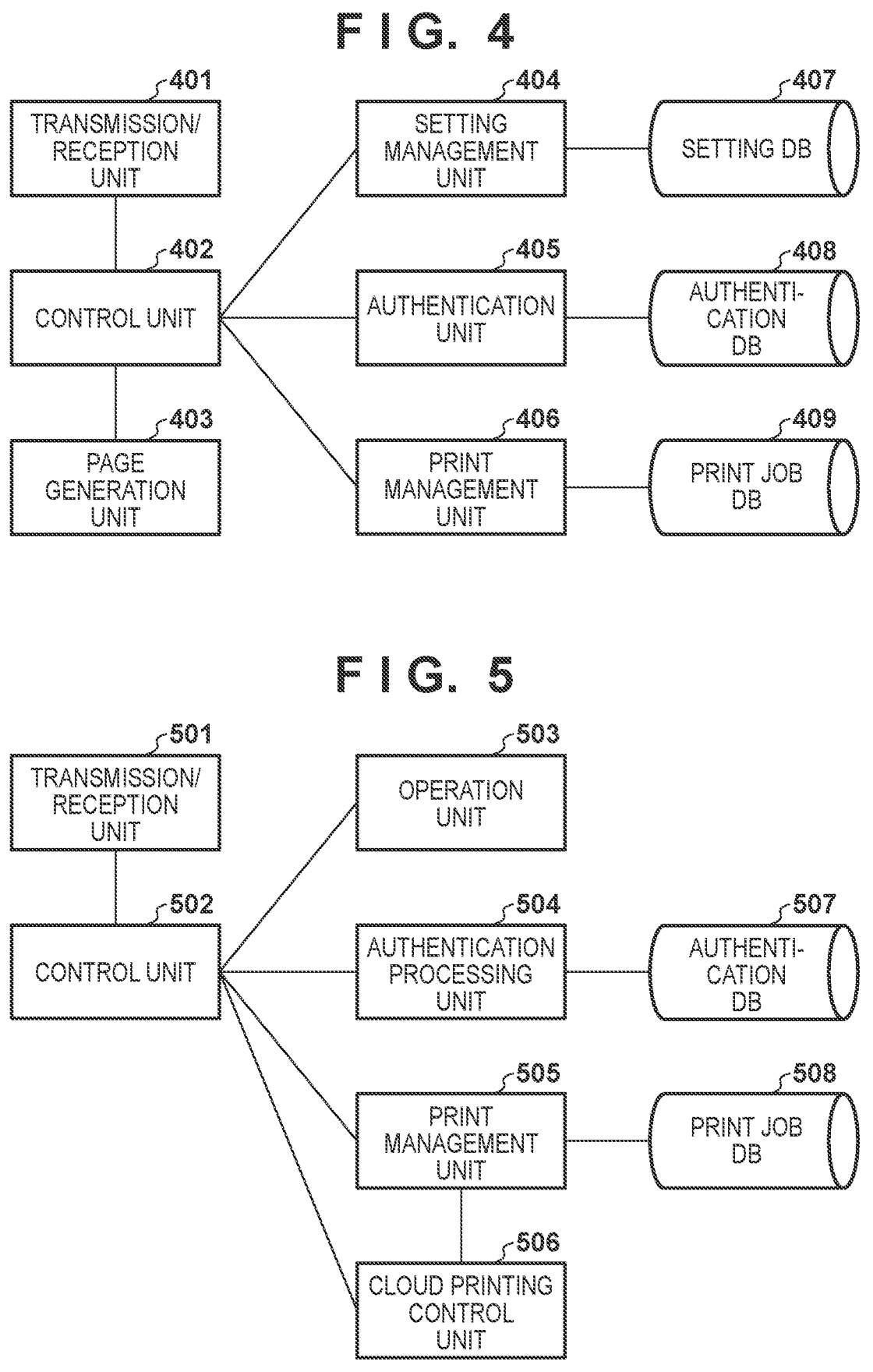

401 TRANSMISSION/RECEPTION UNIT
402 CONTROL UNIT
403 PAGE GENERATION UNIT
404 SETTING MANAGEMENT UNIT
405 AUTHENTICATION UNIT
406 PRINT MANAGEMENT UNIT
407 SETTING DB
408 AUTHENTICATION DB
409 PRINT JOB DB

FIG. 5

501 TRANSMISSION/RECEPTION UNIT
502 CONTROL UNIT
503 OPERATION UNIT
504 AUTHENTICATION PROCESSING UNIT
505 PRINT MANAGEMENT UNIT
506 CLOUD PRINTING CONTROL UNIT
507 AUTHENTICATION DB
508 PRINT JOB DB

701 Printer-name : color MFP 307
702 Print-color-mode-supported : auto, color , monochrome
703 Number-up-supported : 1,2,4,8,16
704 Finishing-supported : staple(4), punch(5)
705 Document-format-supported : pdf, jpeg, pwg-raster
706 Media-type-supported : auto
707 Support-Print-Protocol : AirPrint, Mopria

| NO | PRINTER NAME | Printer ID | SUPPORTED PROTOCOLS | VIRTUAL PRINTER NAME | MFP/ SFP | COLOR SUPPORT |
|---|---|---|---|---|---|---|
| 1 | 107 | 123 | AAP | virtual1 | SFP | COLOR |
| 2 | 108 | 456 | Mopria | virtual1 | MFP | BLACK AND WHITE |
| 3 | 109 | 789 | AAP,Mopria | virtual2 | MFP | COLOR |

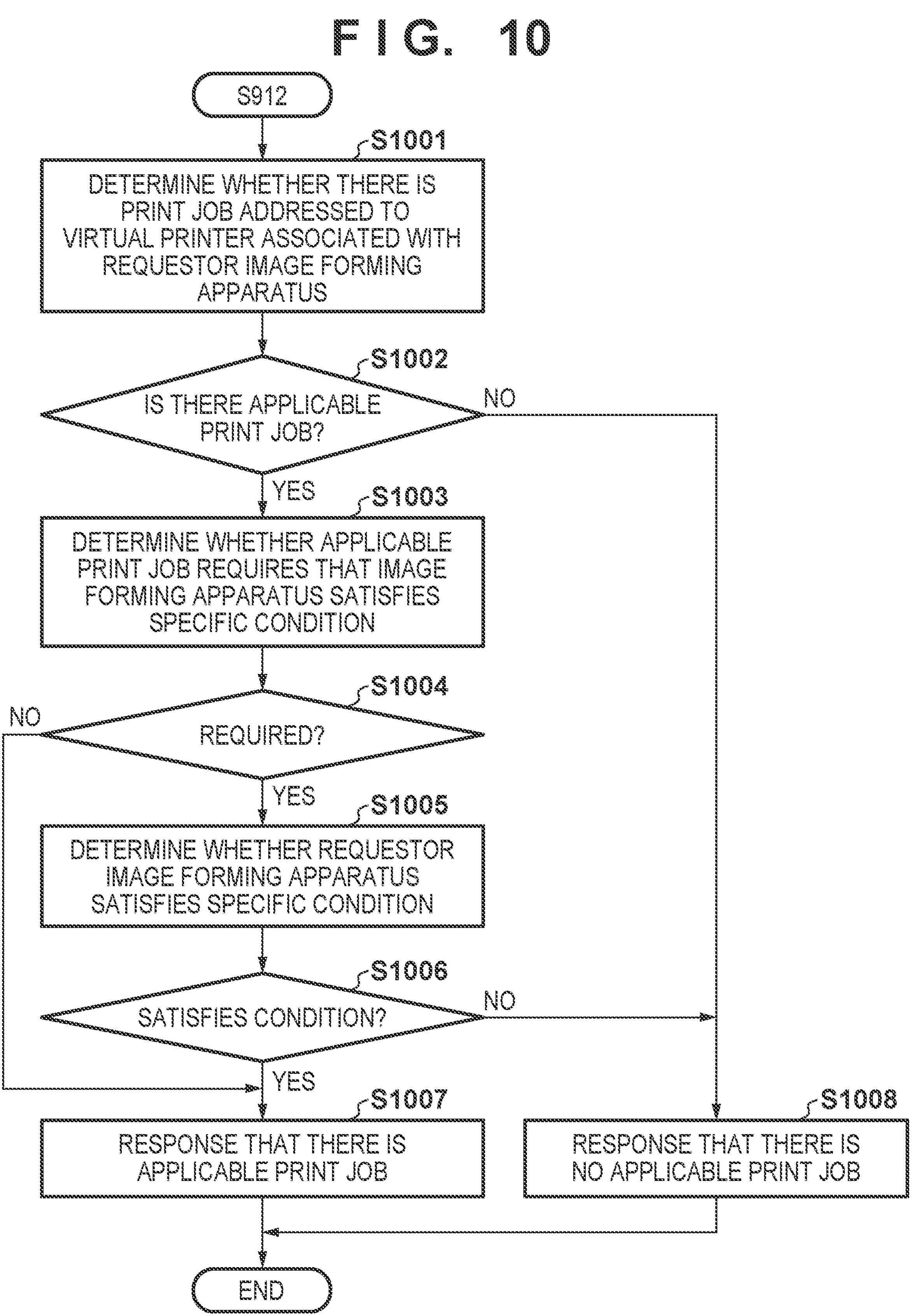
FIG. 10
S912
S1001
DETERMINE WHETHER THERE IS PRINT JOB ADDRESSED TO VIRTUAL PRINTER ASSOCIATED WITH REQUESTOR IMAGE FORMING APPARATUS
S1002
IS THERE APPLICABLE PRINT JOB?
NO
YES
S1003
DETERMINE WHETHER APPLICABLE PRINT JOB REQUIRES THAT IMAGE FORMING APPARATUS SATISFIES SPECIFIC CONDITION
S1004
REQUIRED?
NO
YES
S1005
DETERMINE WHETHER REQUESTOR IMAGE FORMING APPARATUS SATISFIES SPECIFIC CONDITION
S1006
SATISFIES CONDITION?
NO
YES
S1007
RESPONSE THAT THERE IS APPLICABLE PRINT JOB
S1008
RESPONSE THAT THERE IS NO APPLICABLE PRINT JOB
END

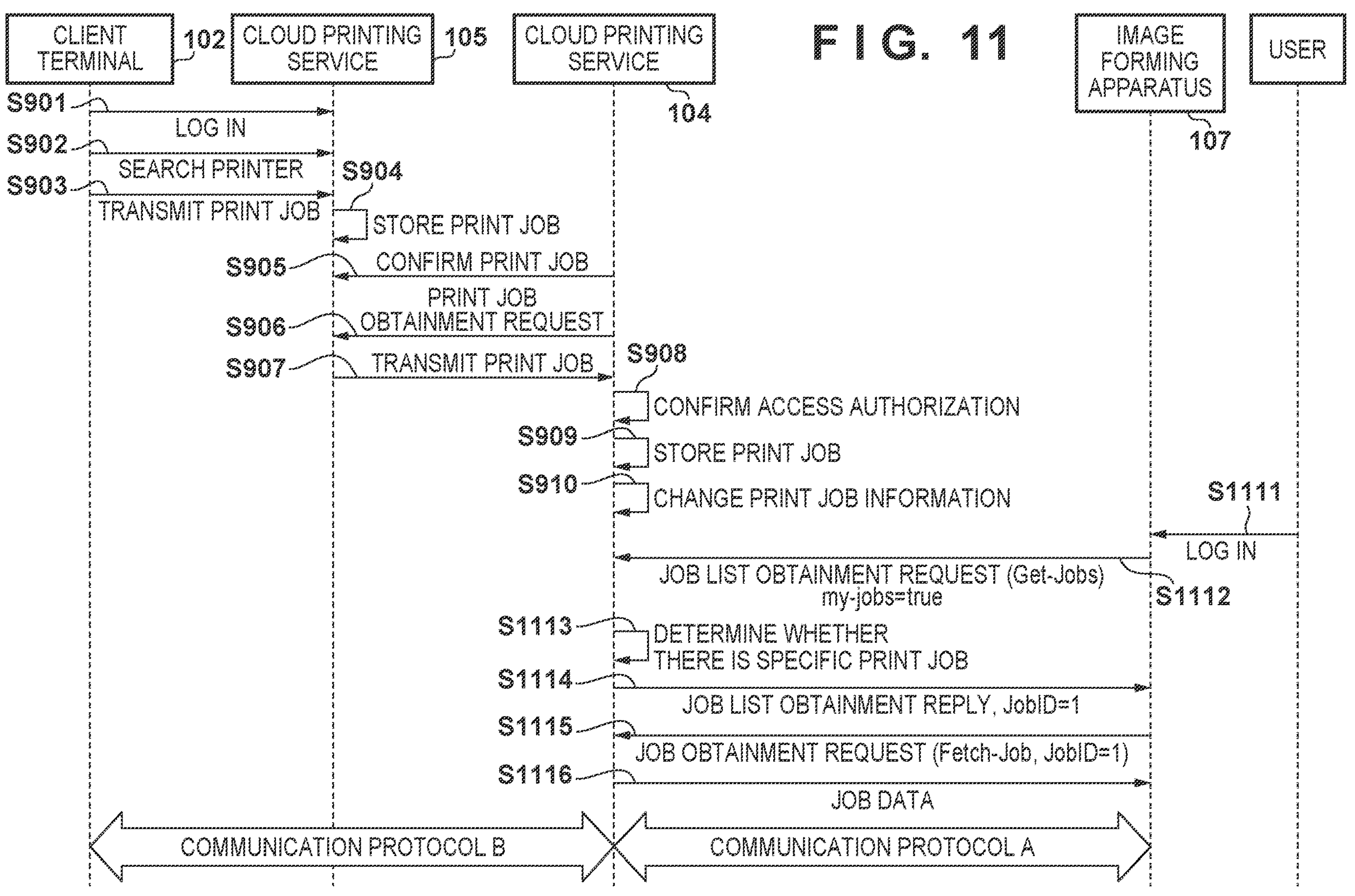
F I G. 11
CLIENT TERMINAL
102
CLOUD PRINTING SERVICE
105
CLOUD PRINTING SERVICE
104
IMAGE FORMING APPARATUS
107
USER
S901
LOG IN
S902
SEARCH PRINTER
S903
TRANSMIT PRINT JOB
S904
STORE PRINT JOB
S905
CONFIRM PRINT JOB
S906
PRINT JOB OBTAINMENT REQUEST
S907
TRANSMIT PRINT JOB
S908
CONFIRM ACCESS AUTHORIZATION
S909
STORE PRINT JOB
S910
CHANGE PRINT JOB INFORMATION
S1111
LOG IN
S1112
JOB LIST OBTAINMENT REQUEST (Get-Jobs) my-jobs=true
S1113
DETERMINE WHETHER THERE IS SPECIFIC PRINT JOB
S1114
JOB LIST OBTAINMENT REPLY, JobID=1
S1115
JOB OBTAINMENT REQUEST (Fetch-Job, JobID=1)
S1116
JOB DATA
COMMUNICATION PROTOCOL B
COMMUNICATION PROTOCOL A 104
107,108,109
CLIENT TERMINAL WEB BROWSER
CLOUD PRINTING SERVICE
IMAGE FORMING APPARATUS
SET VIRTUAL PRINTER
S605
S1301
IS SPECIFIC PRINT PROTOCOL SUPPORTED?
REGISTER VIRTUAL PRINTER
S1302
REGISTRATION COMPLETION
S606

INFORMATION PROCESSING APPARATUS, CONTROL METHOD THEREOF, AND MEDIUM AND PRINTING SYSTEM THEREOF

BACKGROUND OF THE INVENTION

Field of the Invention

The present invention relates to an information processing apparatus that prints a document stored on a network provided by a cloud printing service, a control method thereof, and a medium and a printing system thereof.

Description of the Related Art

In recent years, cloud printing services in which a print job is inputted via a cloud and the print job is transmitted to an image forming apparatus have become popular (refer to, for example, Japanese Patent Laid-Open No. 2012-133489). In such a printing system, an administrator first registers the image forming apparatus to a tenant of a cloud printing service to which the administrator belongs. The administrator sets which users belonging to the tenant are authorized to use the image forming apparatus. Here, the tenant means one service system that a user deploys on the cloud. For example, users and resources of the cloud printing service are managed for each tenant.

A user authorized to use the image forming apparatus inputs a print job from a client terminal to the cloud printing service. The cloud printing service stores the received print job in a storage. The image forming apparatus obtains and prints a print job stored in the cloud printing service.

Representative examples of cloud printing services include, for example, Google Cloud Print (registered trademark), Microsoft Hybrid Cloud Print (registered trademark), Uniflow OnLine (registered trademark), and the like.

In some enterprise user environments, there are cases where client terminals of a plurality of OS vendors and a plurality of cloud services are simultaneously used (multi-tenant). For example, as the client terminals of a plurality of OS vendors, there are terminals such as Windows (registered trademark) OS, macOS (registered trademark) and CHROME (registered trademark) OS. Further, as a plurality of cloud services used with multi-tenancy, there are, for example, Amazon Web Services (registered trademark, AWS), Azure (registered trademark), Google Cloud Platform, and the like. In such cases, it is necessary for the image forming apparatuses that will be used to support all of the print protocols of the cloud printing services, but there are also image forming apparatuses that do not support all of them. For this reason, an intermediary cloud printing service for supporting all of the plurality of print protocols and for centrally managing each print job is arranged between the cloud printing service and the image forming apparatus (see, for example, Japanese Patent Laid-Open No. 2020-35233).

Hereinafter, a cloud printing service will be referred to as a CPS. A second CPS arranged to centrally manage print jobs in the representative example is referred to as an "intermediary CPS", "second CPS", or the like. Sometimes it is simply called a "CPS." Also, a CPS between the intermediary CPS and the client is referred to as an "external CPS", "first CPS", or the like.

In a system that uses the intermediary CPS in addition to the external CPS, the intermediary CPS performs communication with the external CPS via a print protocol supported by the external CPS. Also, the intermediary CPS communicates with the image forming apparatus using a print protocol supported by the image forming apparatus. This enables the image forming apparatus to obtain and process the print job transmitted from the client terminal and stored to the intermediary CPS via the external CPS. The image forming apparatus need not support all of the protocols used by the external CPS, and need only support at least one of the protocols supported by the intermediary CPS.

In such a system, the image forming apparatus is registered in the intermediary CPS, and a virtual image forming apparatus (called a virtual printer) associated with the registered image forming apparatus is provided to the external CPS or a client through the intermediary CPS. At this time, capability information indicating functions and the like provided by the image forming apparatus are notified to the intermediary CPS, and the intermediary CPS manages the virtual printers as having the notified functions. A virtual printer is registered in the external CPS, and at that time the external CPS is also notified of the capability information. A client may transmit a print job to a virtual printer selected from among the virtual printers registered in the external CPS. The intermediary CPS may store the print job transmitted to the virtual printer, and transmit the print job to the image forming apparatus associated with the virtual printer to execute the print job.

In such a conventional configuration, a plurality of image forming apparatuses are registered to the intermediary CPS, and one virtual printer in which the plurality of image forming apparatuses are bundled and associated with each other may be configured. At this time, in a case where the intermediary CPS performs processing for registering the virtual printer to the external CPS, the capability information of the virtual printer to be registered to the external CPS is notified in a similar manner as described above.

In this case, when the capability information of the plurality of image forming apparatuses to be bundled is different, how the capability information of the virtual printer is determined becomes a problem. When a common portion in the capability information of the plurality of image forming apparatuses is made to be the capability information of the virtual printer, capabilities of the individual image forming apparatuses are not taken advantage of. On the other hand, when the sum of the capability information of the plurality of image forming apparatuses is made to be the capability information of the virtual printer, an image forming apparatus lacking a necessary capability may be treated as having the capability through the virtual printer.

For example, in many print protocols supported by an external CPS, use conditions are clearly defined, and in some cases, being able to print by an image forming apparatus that does not satisfy the use conditions of the print protocol is not authorized. In such cases, it may be a prerequisite for the implementation of the printing protocol that the external CPS, intermediary CPS, image forming apparatus, and client terminals that use the printing protocol in question meet the use conditions for use of the printing protocol as a whole system. Thus, the use conditions for the image forming apparatus may be determined based on the capability information.

In such a case, a use condition for the printing protocol is that each of the image forming apparatuses bundled into the virtual printer satisfies the use conditions. Therefore, by setting the capability information common to the plurality of image forming apparatuses in the virtual printer, if the virtual printer satisfies a use condition, it means that all of the bundled image forming apparatuses satisfy the use condition. In this case, an image forming apparatus that satisfies a use condition and an image forming apparatus that does not satisfy a use condition may be bundled in a virtual printer. The image forming apparatus that satisfies the condition can be utilized by using the above-described print protocol as long as it is directly registered to the external CPS or directly connected to the client. Nevertheless, when the virtual printer is mediating, it cannot be used with that printing protocol.

On the other hand, when the sum of the capability information of the plurality of image forming apparatuses is set as the capability information of the virtual printer, image forming apparatuses that do not satisfy a use condition may be bundled in the virtual printer in which the capability information that satisfies the use condition is set. In this case, it is also possible that an image forming apparatus in which a use condition is not satisfied may execute printing using a printing protocol in which the use condition exists.

As described above, in a printing system using a virtual printer in which a plurality of image forming apparatuses are associated with each other, it is difficult to set appropriate capability information for the virtual printer. Therefore, it is difficult to achieve both effective use of resources, for example, an image forming apparatus, and use of an image forming apparatus suitable for a print job.

SUMMARY OF THE INVENTION

According to the present invention, in a printing system using a virtual printer capable of associating a plurality of image forming apparatuses, it is possible to achieve both execution of printing by an image forming apparatus suitable for a print job and effective use of the image forming apparatus.

The present invention in its first aspect provides an information processing apparatus, comprising: at least one memory that stores at least one program; and at least one processor, the at least one program causing the at least one processor to perform: configuring a virtual printer associated with one or a plurality of image forming apparatuses; storing and managing capability information indicating a capability of each of the one or a plurality of image forming apparatuses associated with the virtual printer; determining, when a print job for the virtual printer is received, whether or not the print job is a conditional print job to be executed by an image forming apparatus that satisfies a predetermined condition; in a case where the print job is determined to be the conditional print job, referencing the capability information and specifying an image forming apparatus that satisfies the predetermined condition from among the one or a plurality of image forming apparatuses; and transmitting the conditional print job to an image forming apparatus that satisfies the predetermined condition.

The present invention in its second aspect provides an information processing apparatus, comprising: at least one memory that stores at least one program; and at least one processor, the at least one program causing the at least one processor to perform: configuring a virtual printer associated with one or a plurality of image forming apparatuses; storing and managing capability information indicating a capability of each of the one or a plurality of image forming apparatuses associated with the virtual printer; transmitting, when a print job for the virtual printer is received, the print job to one image forming apparatus among the one or a plurality of the image forming apparatuses, wherein the configuring associates an image forming apparatus that satisfies a condition set in the virtual printer with the virtual printer and does not associate an image forming apparatus that does not satisfy the condition set in the virtual printer with the virtual printer.

The present invention in its third aspect provides a printing system, comprising: an information processing apparatus; one or a plurality of image forming apparatuses connected to the information processing apparatus; and a client terminal connected to the information processing apparatus through or not through a cloud printing service, wherein the information processing apparatus comprises at least one memory that stores at least one program; and at least one processor, the at least one program causing the at least one processor to perform: configure a virtual printer associated with one or a plurality of image forming apparatuses; store and manage capability information indicating a capability of each of the one or a plurality of image forming apparatuses associated with the virtual printer; determine, when a print job for the virtual printer is received, whether or not the print job is a conditional print job to be executed by an image forming apparatus that satisfies a predetermined condition; in a case where the print job is determined to be the conditional print job, reference the capability information and specify an image forming apparatus that satisfies the predetermined condition from among the one or a plurality of image forming apparatuses; and transmit the conditional print job to an image forming apparatus that satisfies the predetermined condition.

The present invention in its fourth aspect provides a printing system, comprising: an information processing apparatus; one or a plurality of image forming apparatuses connected to the information processing apparatus; and a client terminal connected to the information processing apparatus through or not through a cloud printing service, wherein the information processing apparatus comprises at least one memory that stores at least one program; and at least one processor, the at least one program causing the at least one processor to perform: configure a virtual printer associated with one or a plurality of image forming apparatuses; store and manage capability information indicating a capability of each of the one or a plurality of image forming apparatuses associated with the virtual printer; and transmit, when a print job for the virtual printer is received, the print job to one image forming apparatus among the one or a plurality of the image forming apparatuses, wherein an image forming apparatus that satisfies a condition set in the virtual printer is associated with the virtual printer and an image forming apparatus that does not satisfy the condition set in the virtual printer is not associated with the virtual printer.

According to the present invention, in a printing system using a virtual printer capable of associating a plurality of image forming apparatuses, it is possible to achieve both execution of printing by an image forming apparatus suitable for a print job and effective use of image forming apparatuses.

Further features of the present invention will become apparent from the following description of exemplary embodiments with reference to the attached drawings.

BRIEF DESCRIPTION OF THE DRAWINGS

FIG. 1 is a configuration diagram of an environment in which a plurality of cloud printing services are used.

FIG. 4 is a software configuration diagram of the cloud printing service 104.

FIG. 5 is a software configuration diagram of the image forming apparatus 107.

FIG. 7 is an example of capability information of an image forming apparatus added to a virtual printer.

FIG. 8 is an information table of an image forming apparatus managed by the cloud printing service 104.

FIG. 10 is a flowchart of a procedure for determining that the image forming apparatus satisfies the condition in the first embodiment.

FIG. 11 is a sequence diagram of a job obtainment in a first embodiment.

DESCRIPTION OF THE EMBODIMENTS

Figure 2:
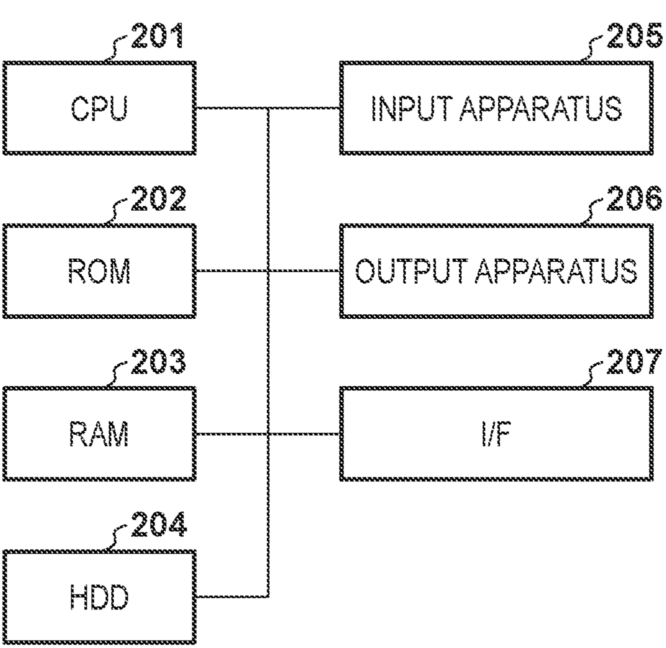
FIG. 2 is a hardware configuration diagram of a cloud printing service 104.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of a Cloud Printing System

A cloud printing system according to the present embodiment will be described with reference to an example of FIG. 1. Client terminals 101 to 103 input print jobs to a respective CPS. A CPS 104 corresponds to the intermediary CPS described in the prior art, constitutes a virtual printer, and provides the virtual printer to external CPSs 105 and 106 and the client terminal 101. The CPS 104 obtains print jobs from the external CPSs 105 and 106 through the virtual printer and also receives print jobs from the client terminal 101. The external CPS supports a communication protocol for printing (also simply referred to as a communication protocol) used for each printing service.

The external CPSs 105 and 106 receive print jobs from the client terminals 102 and 103 in accordance with respective supported print protocols and transmits them to the virtual printer provided by the CPS 104. Image forming apparatuses 107, 108, and 109 obtain print jobs from the CPS 104 and execute print processing.

Here, at least one of the image forming apparatuses 107, 108, and 109 may support only communication protocol A. In this case, the image forming apparatus cannot perform printing processing using another communication protocol, for example, the communication protocol B or the communication protocol C. Thus, by installing the CPS 104 between the external CPS 105 and the external CPS 106, print processing in the image forming apparatus by the communication protocol A is enabled since the CPS 104 supports the plurality of communication protocols. In this case, even if the intermediary CPS 104 is accessed from the external CPS by a communication protocol supported by the intermediary CPS 104 other than the communication protocol A, printing using an image forming apparatus supporting the communication protocol A can be performed. For this reason, for example, even when the use condition of the image forming apparatus is that the communication protocol B is supported, an image forming apparatus that does not support the communication protocol B may be end up able to perform the printing. In the present embodiment described below, the occurrence of such a situation can be prevented.

<Hardware Configuration>

FIG. 2 is a block diagram illustrating a hardware configuration of the CPS 104 of FIG. 1. The hardware of the CPS 104 may be an information processing apparatus such as a general-purpose computer. In FIG. 2, a CPU 201 directly or indirectly controls each device (such as a ROM and a RAM) connected by an internal bus, and executes a program for realizing the present embodiment. A ROM 202 stores BIOS. A RAM (direct storage apparatus) 203 is used as a work area of the CPU 201 or as a primary storage for loading a software module for realizing the present embodiment. An HDD 204 is a hard disk drive (HDD), a solid state drive (SSD), or the like in which an OS or a software module, which is basic software, is stored. An input apparatus 205 includes a keyboard, a pointing device, and the like. A display is used as an output apparatus 206, for example. A communication interface (UF) 207 is an interface for connecting to a network 100.

Figure 3:
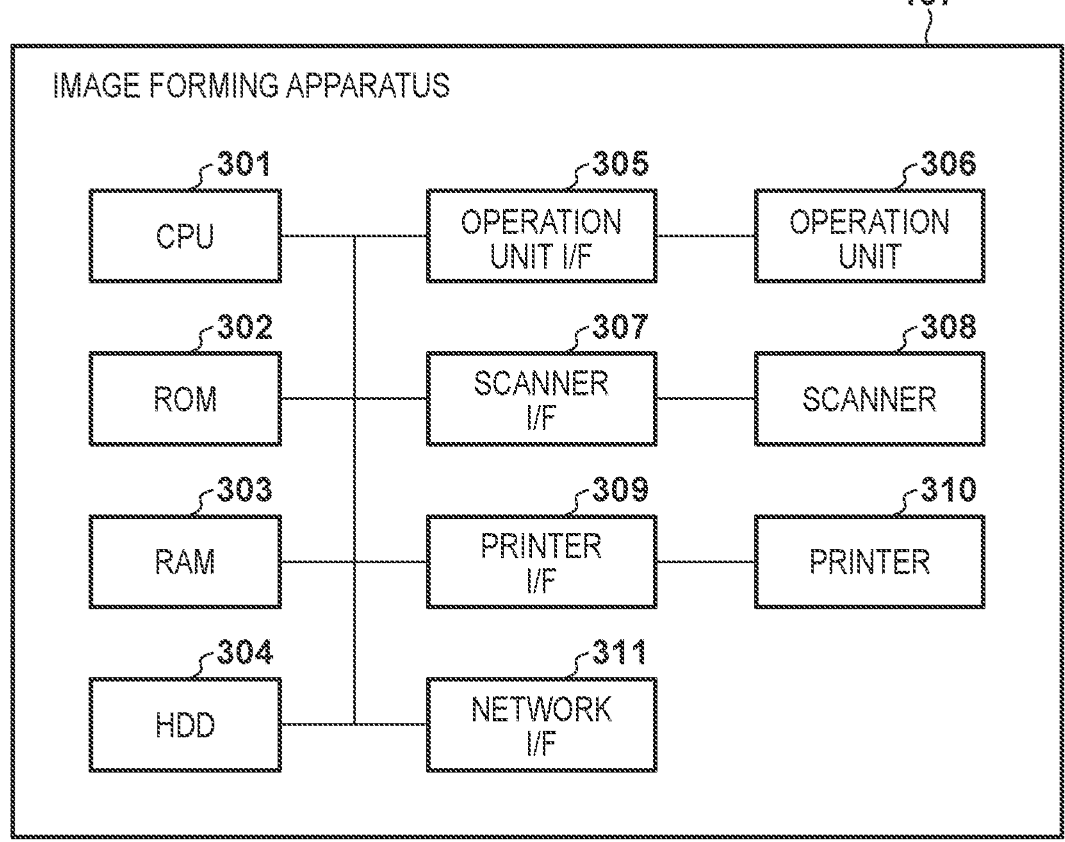
FIG. 3 is a hardware configuration diagram of an image forming apparatus 107.

FIG. 3 is a block diagram illustrating a hardware configuration of the image forming apparatus 107 of FIG. 1. Note, the image forming apparatuses 108 and 109 have a similar configuration. In FIG. 3, a CPU 301 to an HDD 304 are similar to the CPU 201 to the HDD 204.

An operation unit 306 includes a liquid crystal display unit having a touch panel function, various hardware keys, and the like. An operation unit OF 305 functions as a display unit that displays information to a user and a receiving unit that receives instructions from the user. The CPU 301 performs information display control and user operation acceptance control in cooperation with the operation unit OF 305.

A scanner 308 reads a document placed on a document table (not shown) and generates image data via a scanner OF 307. The generated image data may be printed by a printer 310, stored in a storage 304, or transmitted to an external device via a network I/F 311.

The printer 310 prints an image on a sheet fed from a sheet feed cassette (not shown) based on a print image or a print control command inputted via a printer OF 309. The printing method may be an electrophotographic method in which toner is transferred onto paper and fixed, or may be an inkjet method in which ink is ejected onto paper for printing.

The network OF 311 is connected to a network cable and can execute communication with external devices on the Internet, such as the CPS 104. In the present embodiment, it is assumed that the communication interface performs wired communication compliant with Ethernet (registered trademark), but the present invention is not limited thereto. For example, the communication interface may be an IEEE802.11 series compliant wireless communication interface. Further, the communication interface may be a communication interface that performs mobile communication such as a 3G line such as CDMA, a 4G line for LTE or the like, and 5G NR. Note that the scanner 308 and the scanner OF 307 are not essential in the image forming apparatus, and a configuration without a scanner may be taken.

<Software Configuration>

FIG. 4 is a block diagram of a software module operating on the CPS 104. Note that each software module is stored in the HDD 204 shown in FIG. 2, and is loaded into the RAM 203 and executed by the CPU 201. A transmission/reception unit 401 processes communication with a Web browser or a printing service of the client terminal 101 or the image forming apparatus 107, and transmits and receives data. A control unit 402 executes processing in accordance with a request received by the transmission/reception unit 401. A page generation unit 403 generates a Web page for returning a response to a Web browser. A setting management unit 404 performs control by storing various types of setting information related to the CPS 104, information of an external CPS to be linked, and information of an image forming apparatus registered to the CPS 104 in a setting DB 407. An authentication unit 405 uses an authentication DB 408, in which user account information of each CPS is stored, to authenticate a user who has made a login request to the CPS 104 and to control a user authentication request to the external CPS.

A print management unit 406 performs control for storing the print job received from the client terminal 301 or the print job obtained from the external CPS in a print job DB 409, and performs image processing such as rendering on the print job. Also, the print management unit 406 configures virtual printers in which the image forming apparatuses connected to the CPS 104 are virtualized. Virtual printers are presented as virtualized image forming apparatuses to the external CPS s and client terminals. When the external CPS or the client terminal inputs a print job to the virtual printer, the CPS 104 stores the print job in the print job DB 409.

FIG. 5 is a block diagram of a software module operating on the image forming apparatus 107. Note, the image forming apparatuses 108 and 109 have a similar configuration. A transmission and reception unit 501 processes communication with the CPS 104 and transmits and receives data. A control unit 502 executes processing in accordance with a request received by the transmission and reception unit 501. An operation unit 503 performs display control of the printing screen and various setting lists of the image forming apparatus 107 on the operation unit 306 via the operation unit I/F 305. An authentication processing unit 504 uses an authentication DB 507, in which user account information of a CPS is stored, to authenticate a user who has made a login request to the image forming apparatus 107 and to control a user authentication request to the CPS. A print management unit 505 receives a print request from a cloud printing control unit 506 based on the print data obtained from the CPS 104, and performs control to store the print request in a print job DB 508. Further, the printing is performed on the printer 310 via the printer I/F 309 to perform a series of printing processes until the sheet is discharged.

The cloud printing control unit 506 is a cloud printing control block, and performs management and control in order to perform printing processing of a cloud job within the image forming apparatus 107 by network communication with the CPS 104.

<Procedure for Registering Printer to Cloud Printing Service>

Figure 6:
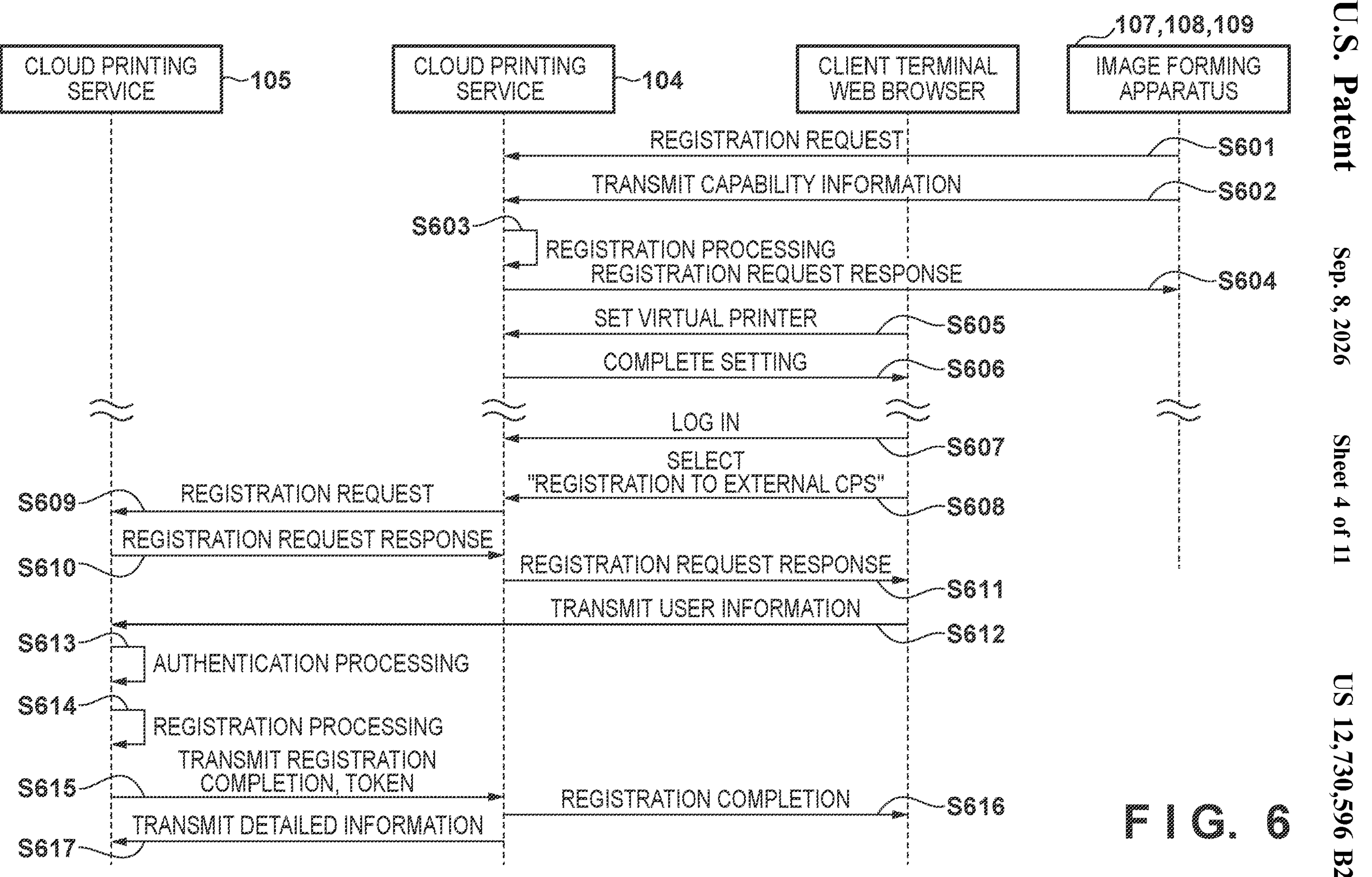
FIG. 6 is a view of a registration sequence for registering an image forming apparatus to an external CPS 105 of FIG. 1.

Next, a procedure for printer registration, that is, registration of an image forming apparatus according to the present embodiment will be described. FIG. 6 illustrates an example of a procedure performed by each apparatus when the image forming apparatus is registered in the cloud printing service. Note that the image forming apparatuses 108 and 109 can operate similarly to the image forming apparatus 107.

First, the image forming apparatus 107 requests the CPS 104 to register the printer (step S601). This request includes processing such as authorization required for the image forming apparatus 107 to start processing so that it will belong to and be managed by the CPS 104.

The image forming apparatus 107 that is capable of processing for registering to the CPS 104 by processing such as authentication notifies the CPS 104 of the capability information including a print condition under which it can print (step S602). Examples of the capability information may include information indicating whether the printer is capable of color printing or only monochrome printing, whether the printer supports color, and whether the printer is an MFP model or an SFP model. Further, the capability information includes information on a printing protocol supported by the image forming apparatus 107. Note, it is assumed that the image forming apparatus 107 and the CPS 104 are connected to each other in accordance with a predetermined protocol that they both support. The information about the supported print protocol included in the capability information of the image forming apparatus need not be referenced for connecting the CPS 104 to the image forming apparatus 107.

The CPS 104, after receiving the capability information, manages an identifier and the respective capability information in the database by associating the identifier and the respective capability information for each image forming apparatus that is requested to be registered (step S603). Then, the CPS 104 notifies the image forming apparatus 107 of the completion of the process as a response, thereby completing the process of registering the image forming apparatus 107 (step S604).

FIG. 7 illustrates an example of capability information 700. The capability information 700 includes a printer name 701, a color/monochrome print capability 702, a support status 703 for 2-in-1 or the like, supported capabilities 704 for various finishing processes, printable document format types 705, supported sheets 706, and the like. The capability information 700 also includes supported print protocols. However, not all of supported print protocols need be included here. Included is information of printing protocols to be checked as a printing condition. The information to be checked as the printing condition is not limited to the supported printing protocols, and other types of information may be included in the capability information.

After step S604, a setting screen on the CPS 104 is displayed on the client terminal side, and the registered image forming apparatus 107 is set to be associated with the virtual printer on the CPS (step S605). This is also referred to as a setting or a configuration of a virtual printer. By setting the virtual printer as described above, the CPS 104 operates as an alternative to the image forming apparatus 107 as a virtual printer to the external CPS 105.

FIG. 8 illustrates an example of a management table for managing image forming apparatuses. When the CPS 104 receives the capability information of the image forming apparatus 107 in step S602, the setting management unit 404 of the CPS 104 generates a management table 800 as illustrated in FIG. 8 in the registration processing of step S603, stores the management table 800 in the setting DB 407, and manages the management table 800. The management table 800 is an example in which the capability information is managed for each of the image forming apparatuses requested to be registered in step S601. In the management table 800, capability information such as a printer name, an identifier thereof, print protocols supported by the image forming apparatus, an MFP/SFP model, and a color printing support status are registered. In addition, in step S605, according to the setting of the step S604, the management table 800 registers information on which virtual printers managed in the CPS 104 each of the image forming apparatuses belongs to. Thus, the actual image forming apparatus and the virtual printer are associated with each other.

The virtual printer setting processing is completed when the CPS 104 responds to the client terminal that the processing of associating the printer as a virtual printer is complete (step S606). Virtual printers configured in this way can be handled from clients and the external CPSs similarly to network printers or locally connected printers.

When a printer registration request is performed from a client terminal to an external CPS, since the CPS 104 has registered the image forming apparatus 107, if the client terminal supports the CPS 104, it will become able to input print jobs to the image forming apparatus 107 through the CPS 104.

<Procedure of Registering Virtual Printer to External CPS>

A description of step S607 and beyond will describe exemplary sequences for registering a virtual printer configured by the CPS 104 to an external CPS (this is referred to as a printer registration).

The URL of the Web server of the CPS 104 is accessed from the client terminal, an authentication request is made, the CPS 104, after receiving the request, performs an authentication process, and upon successful authentication, the CPS 104 responds to the client terminal with a registration target printer list (step S607). This response is, for example, screen information and includes, in addition to the printer list, for example, an "external CPS linkage" button for registering a selected printer to an external CPS and a list of external CPS s that can be linked.

In a case where a specific printer is selected from the printer list of the response by an operation of the client terminal and "external CPS linkage" is requested, the CPS 104 makes a printer registration request to the designated external CPS (step S609). For example, when "external CPS linkage" is selected and the CPS 105 is selected as the external CPS, the CPS 104 requests the CPS 105 to register the printers. The printer registration request includes information about a virtual printer to be registered. This information may include identification information and capability information of the virtual printers, but the capability information may be transmitted in step S617 later.

The CPS 105, after receiving the printer registration request, returns a URL for inputting the authentication information and a temporary password for authentication to the CPS 104 as a registration response (step S610). The CPS 104, after receiving a response from the CPS 105, transmits authentication information input screen to the client terminal (step S611).

When the authentication information registered in the CPS 105 is inputted by the client terminal (step S612), the CPS 105 executes the authentication processing (step S613). If the CPS 105 determines that the authentication is successful, printer registration processing is performed in response to the printer registration request accepted in step S609 (step S614). The CPS 105 then transmits a response of a registration success and access token information to be used in subsequent communications to the CPS 104 (step S615).

The CPS 104, after receiving the registration success, notifies the client terminal of the registration success (step S616). Thereafter, the CPS 104 performs detailed device information registration processing as a virtual printer of the image forming apparatus 107 using the information of step S603 (step S617).

Virtual printer Capability Information

Here, an example of a method of setting capability information of a virtual printer will be described. The maximum capability for each item in the capability information of the image forming apparatuses associated with the virtual printer is determined and the capability information of the virtual printer is set so as to include the determined maximum capability for each item. For example, in the management table 800 of FIG. 8, the image forming apparatus 107 and the image forming apparatus 108 are associated with one virtual printer virtual 1. For color support, which is one item of the capability information, the image forming apparatus 107 supports color printing, while the image forming apparatus 108 supports only black and white printing. Since the image forming apparatus 107 that supports color printing naturally also supports black and white printing, the capability information of the virtual printer regarding color support is the maximum capability, i.e., "color". As for supported protocols, the image forming apparatus 107 supports the AirPrint (AAP) (registered trademark, hereinafter omitted) protocol, while the image forming apparatus 108 supports the Mopria (registered trademark, hereinafter omitted) protocol. Thus, the capability information of the virtual printer with respect to supported protocols would be "AAP and Mopria".

The image forming apparatus 109 is independently associated with one virtual printer virtual2. Therefore, the capability information of the image forming apparatus 109 may be directly used as the capability information of the virtual printer virtual2. Note that items included only in the capability information of some of the image forming apparatuses associated with the virtual printer need not be included in the capability information of the virtual printer.

<Processing from Input of a Print Job from a Terminal of the CPS 105 Until Notification to the Image Forming Apparatus 107>

Figure 9:
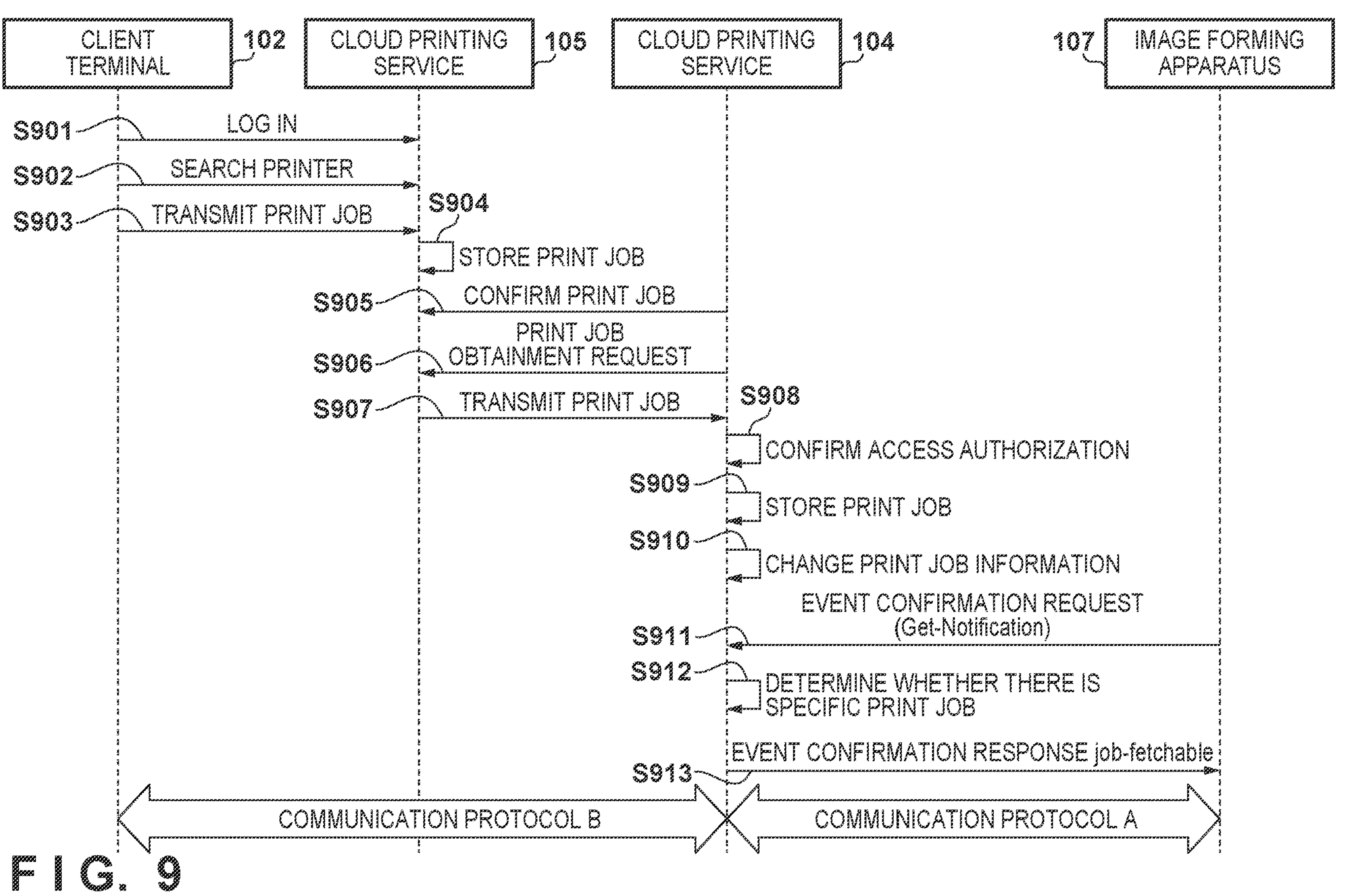
FIG. 9 is a sequence diagram of a job notification in a first embodiment.

Processing for input of a job from the client terminal of the CPS 105 will be described with reference to FIG. 9. In the present embodiment, the print protocol of the inputted job is determined, and a notification or a job transmission is performed to the image forming apparatus 107 which supports the print protocol.

First, the user logs in to the CPS 105 from the client terminal 102 using the account name registered in the CPS 105 (step S901). Next, an image forming apparatus registered in the CPS 105 is searched for from the print processing from the client terminal (step S902). Since the CPS 105 stores the information registered in step S611, an image forming apparatus is found. The image forming apparatus registered thereafter is referred to as a virtual printer "virtual printer 1". It is assumed that the image forming apparatus 107 and the image forming apparatus 108 are registered and associated under the umbrella of the virtual printer.

Note, in step S902, a virtual printer that matches the conditions may be the target of the search. For example, a client that uses AirPrint as a protocol may search for a virtual printer in which AirPrint support is included in the capability information. In this case, the client terminal displays virtual printers supporting AirPrint as available virtual printers, from which the user can select a virtual printer to which the print job is to be transmitted.

Next, the user selects an arbitrary print job and instructs “virtual printer 1” to execute printing thereof. The client terminal 102, after receiving the instruction to execute printing, transmits the print job to the CPS 105 (step S903). The CPS 105, after receiving the print job, stores the print job in the storage (step S904).

Since the CPS 104 is registered to the CPS 105 as the “virtual printer 1”, the transmission/reception unit 401 periodically confirms whether or not a print job addressed to the virtual printer 1 exists in the CPS 105 (step S905). In step S905, when it is determined that there is an applicable print job, the CPS 104 requests that the CPS 105 obtain the applicable print job (step S906). Since the access token obtained in step S615 and the obtainment request are issued at this time, it is determined that the CPS 104 can be a trusted. Then, the CPS 105 transmits the print job addressed to the virtual printer 1 to the CPS 104 in response to the obtainment request (step S907).

For the CPS 104, after obtaining the print job, the control unit 402 first refers to the setting DB and determines whose job the print job is for (step S908). Next, it is determined whether the user is an authorized user of the virtual printer 1. If the print job is not to be authorized, the obtained print job is discarded, and a response indicating an access error is given to the CPS 105. If the print job is to be authorized, the obtained print job is stored in the print job DB 409 (step S909).

Next, the CPS 104 performs protocol conversion by the control unit 402 so as to be able to transmit and receive data to and from an image forming apparatus, for example, the image forming apparatus 107, which is under the umbrella of the virtual printer (step S910). In the protocol conversion, the CPS 104 converts data properties of the print job from the CPS 105 communication protocol format (e.g., HTTP) to a communication protocol format (e.g., IPP) used by the CPS 104. Here, HTTP is an abbreviation for hypertext transfer protocol, and IPP is an abbreviation for Internet printing protocol.

The image forming apparatus 107, which is under the umbrella of the virtual printer, is registered so as to be registered to the CPS 104 in FIG. 6. In the image forming apparatus 107, after it is associated with the virtual printer, the cloud printing control unit 506 periodically transmits an event confirmation request to the CPS 104 to confirm whether or not there is a print job that is self-addressed (step S911). The event to be confirmed may be that a self-addressed print job is newly saved. Self-addressed means that the print job transmitted to the virtual printer 1 with which the image forming apparatus 107 has been associated. Note that if the image forming apparatus 107 is managed by login instead of periodically confirming the print job, an event confirmation request may be transmitted at a timing when a specific user logs in to the image forming apparatus 107.

In response to the event confirmation request of step S911, the CPS 104 determines whether or not there is a print job to be notified to the transmission source of the event confirmation request (step S912). A case where there is a print job to be notified is a case where all of the following conditions are satisfied. First, there is a print job addressed to the virtual printer associated with the image forming apparatus of the transmission source. Second, if the print job is a print job that requires the image forming apparatus that executes the print job to satisfy a specific condition, the transmission source of the event confirmation request is an image forming apparatus that satisfies the specific condition. In a case where there is no specific condition, only the first condition needs to be satisfied. One example of a specific condition is that the print job is a print job transmitted by a predetermined protocol, e.g., AirPrint.

In step S912, the CPS 104 refers to the print job DB 409 in response to the event confirmation request of step S911. When the CPS 104 determines that there is a print job, the control unit 402 determines, based on the setting DB 407, whether that print job is a print job that requires the image forming apparatus to include a specific condition. In a case where it is determined that the print job is such a print job, the transmission/reception unit 401 determines whether or not the image forming apparatus that is the transmission source of the event confirmation request satisfies the condition. If this condition is satisfied, a response of the print job confirmation request is notified to the image forming apparatus (step S913). Notification is not given to an image forming apparatus that is under the umbrella of a virtual printer that does not satisfy the condition. In this case, a response may be given that there are no events (or print jobs) to be notified.

Further, instead of confirming by polling, the CPS 104 and the image forming apparatus 107 may be connected at all times, and the image forming apparatus 107 may be notified of the presence of a print job that satisfies a condition by a Push notification when the print job is stored in the CPS 104.

If a print job is notified to the image forming apparatus, the image forming apparatus may request and obtain the print job notified to the CPS 104 in accordance with an operation by the user, and may execute and print the print job.

Specification of Applicable Print Job (Step S912)

FIG. 10 shows the details of step S912 by the CPS 104. The CPS 104 refers to the print job DB 409 in response to the event confirmation request of step S911, and determines whether or not there is a print job addressed to the virtual printer 1 (step S1001). If it is determined that there is an applicable print job (step S1002—YES), the control unit 402 determines, from the setting DB 407, whether the applicable print job is a print job that requires the image forming apparatus to include a specific condition (step S1003). For example, the setting DB 407 determines whether the print job conforms to a protocol that requires that the image forming apparatus will execute it supports the protocol of the print job. Note that a print job that requires that the image forming apparatus includes a specific condition is sometimes referred to as a conditional print job.

Such protocols include, for example, the above-described AirPrint. AirPrint requires that there be a condition that the image forming apparatus executing the print job supports AirPrint. The presence of the CPS 104 also technically allows AirPrint print jobs to be executed by image forming apparatuses that do not support AirPrint. However, it is assumed that AirPrint print jobs are not allowed to be executed by an image forming apparatus that does not support AirPrint in the present embodiment.

In step S1003, as the method of determining whether a print job is applicable, a property can be confirmed when the job is inputted, and the determination can be made based on the property. For example, an example of a method of determining that a job is an AirPrint job as a specific print condition will be described. In this example, if the format of a print job or document inputted from iOS (registered trademark) or macOS (registered trademark) is an AirPrint proprietary format, the print job is determined to be an AirPrint job. Alternatively, if both of these conditions are satisfied, it may be determined that the job is a AirPrint job. It may also be determined by a property, API, or the like that indicates client type information of the other independent job input. In this way, whether or not a print job requires a specific condition, not limited to AirPrint, may be determined based on a protocol that the print job complies with. The protocol may be determined based on the properties and format of the print job.

In a case where it is determined that the print job is an applicable print job (step S1004—YES), the image forming apparatus, which is the transmission source of the event obtainment request, determines whether the print job satisfies the required specific condition (step S1005). If the condition is satisfied (step S1006—YES), a response that there is an applicable print job is made (step S1007). Here, a list including identification information of the applicable print job may be responded. In a case where it is determined in step S1004 that the print job is not the applicable print job (step S1004—NO), the processing branches to step S1007 because there is no particular condition to be satisfied.

On the other hand, in a case where it is determined in step S1002 that there is no applicable print job, and in a case where it is determined in step S1006 that the image forming apparatus that is the transmission source of the event request does not satisfy the condition, a response that there is no applicable print job is made (step S1008).

Note, in a case where a plurality of applicable print jobs are found in step S1001, the processing of steps S1002 to S1006 is performed on each print job. In a case where there is no applicable print job, the processing of step S1008 may be executed, and when there is even just one applicable print job, the processing of step S1007 may be executed.

For example, in a case where it is determined in step S1004 that the job is an AirPrint job, in step S1005, the management table 800 of FIG. 8 is referred to, and the transmission/reception unit 401 specifies an image forming apparatus that supports AirPrint among the image forming apparatuses associated with the virtual printer 1. In the example of FIG. 8, AAP in the supported protocols means that AirPrint is supported. That is, in step S1005, the image forming apparatus 107 is specified as an image forming apparatus that supports AirPrint. Then, it is determined whether the specified image forming apparatus includes the image forming apparatus that is a transmission source of the event obtainment request.

As described above, capability information indicating the condition is set in the virtual printer with which the image forming apparatus that has the specific condition is associated. Therefore, in the client or the external CPS that references the virtual printer, it can be determined that the virtual printer satisfies the corresponding condition, and the virtual printer can be used for the print job on the assumption of the condition. On the other hand, the presence of a print job that assumes a specific condition that the image forming apparatus has, is notified only to image forming apparatuses that have that condition, and is not notified to image forming apparatuses that do not have that condition. Thus, even in a system for printing via a virtual printer in which an image forming apparatus having a condition and an image forming apparatus not having a condition are bundled together, a print job that assumes as a precondition specific capability information can be executed by an image forming apparatus that satisfies the condition.

The above-described condition is, for example, that the image forming apparatus has a specific capability. In a virtual printer with which such an image forming apparatus is associated, capability information indicating the capability is set. Therefore, in the client or the external CPS that refers to the virtual printer, it can be determined that the virtual printer has the corresponding capability, and the virtual printer can be used for the print job premised upon the capability. On the other hand, the presence of a print job that assumes a specific capability of the image forming apparatus is notified only to an image forming apparatus that has that capability, and is not notified to image forming apparatuses that do not have the capability. Thus, even in a system for printing via a virtual printer in which a plurality of image forming apparatuses having different capabilities are bundled together, a print job premised upon specific capability information can be executed by an image forming apparatus that satisfies the condition. The capability may be that a specific protocol is supported, and the protocol may be AirPrint, for example. This allows AirPrint print jobs to be printed only with printers that support AirPrint.

In this way, even in a printing system in which printing is performed using a virtual printer in which a plurality of image forming apparatuses are associated with each other, printing using an image forming apparatus suitable for a print job can be performed. At the same time, the capabilities of the image forming apparatuses can be effectively utilized. Furthermore, the convenience of bundling a plurality of image forming apparatuses into a single virtual printer is not impaired.

Also, a user who intends to execute printing by the image forming apparatus may download and execute a print job that the image forming apparatus can receive, and therefore the convenience of the cloud printing service is not impaired.

Modification of First Embodiment

<Job Obtainment Processing after Logging into the Image Forming Apparatus 107>

In the present modification, a process for obtaining a job to the CPS 104 by the image forming apparatus 107 after the sequence from steps S901 to S910 in which the CPS 105 inputs a job to the CPS 104 is described with reference to FIG. 11. In this example, as illustrated in FIG. 9, the print job is obtained and executed in response to a user logging in, without the image forming apparatus periodically transmitting an event obtainment request to the CPS 104. Note that here, as the specific condition of the above-described embodiment, an example in which, in a case where a print job is an AirPrint print job, the image forming apparatus that executes the print job supports AirPrint is described.

First, the user logs in to the image forming apparatus 107, which is associated with the virtual printer (step S1111). Then, in the image forming apparatus 107, after receiving the login, the transmission and reception unit 501 transmits a request to obtain print jobs of the user to the CPS 104 based on the login information (step S1112). The CPS 104 refers to the authentication DB 408 to determine whether there is a print job of the user, and if there is a print job, the CPS 104 determines whether the print protocol of the applicable job is an AirPrint job (step S1113). The method for the determination is similar to that of step S912.

Figures 12, 13:
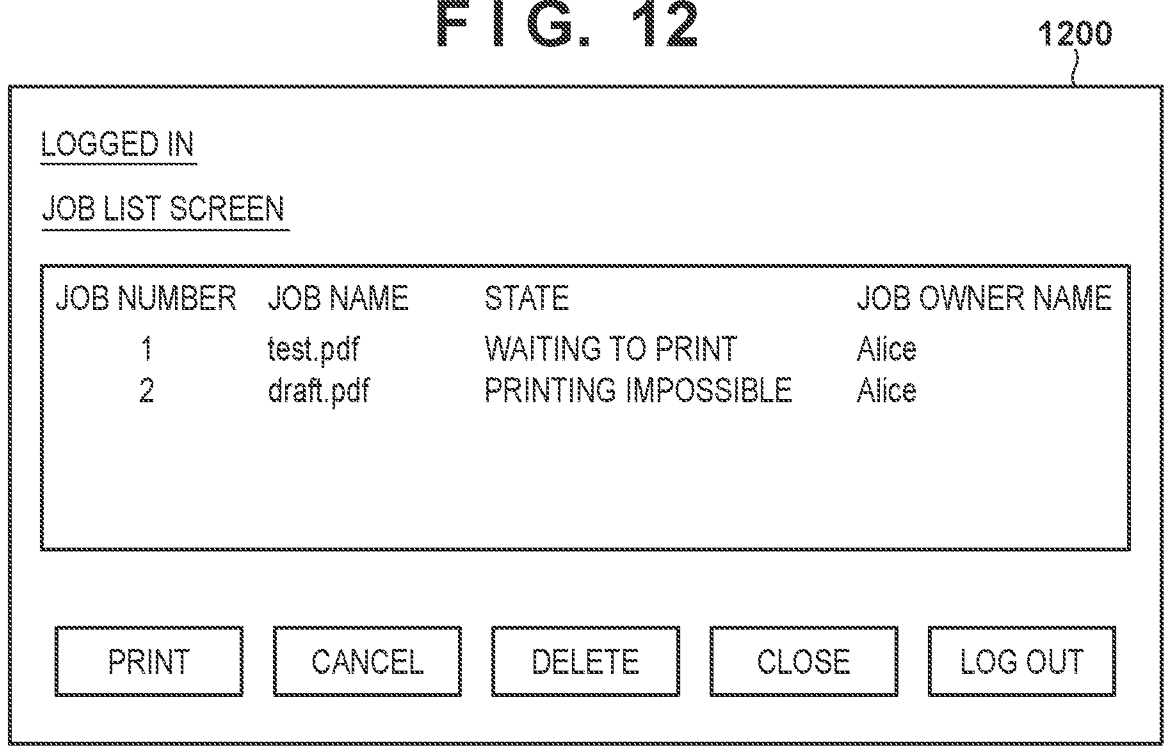
FIG. 12 is a screen of a job obtainment list in the first embodiment.
FIG. 13 is a registration sequence diagram of the cloud printing service 104 in a second embodiment.

Next, a print job list is transmitted to the image forming apparatus (step S1114). At this time, a display as shown in FIG. 12 is performed for an image forming apparatus that does not support AirPrint, and in a case where an AirPrint job has been transmitted, the user is notified that printing is not possible. In addition, configuration may be taken such that the AirPrint job is not transmitted and is not visible. For an image forming apparatus that supports AirPrint, the user is notified that an AirPrint print job is also printable (waiting to print).

Next, the image forming apparatus 107 requests, by the transmission and reception unit 501, the CPS 104 to obtain a job selected by the user by the operation unit 503 (step S1115). Next, the CPS 104 transmits a print job to the image forming apparatus 107 (step S1116). At this time, in a case where the AirPrint job of FIG. 12 is selected for an image forming apparatus that does not support AirPrint, a print impossible notification is notified to the image forming apparatus 107.

A login trigger in step S1111 may also trigger a response for the print job confirmation request in step S913. This allows AirPrint jobs to be printed only with AirPrint supported printers. This is not limited to AirPrint, and can be applied to cases where a print job needs to be executed by a suitable image forming apparatus.

As described above, according to the present modification, in addition to the advantages of the first embodiment, it is not necessary to periodically poll the CPS 104 from the image forming apparatus, and it is possible to obtain a print job to be printed by the image forming apparatus from the CPS 104 when the user logs in.

Second Embodiment

With regard to the registration of the image forming apparatus with the CPS 104 of the first embodiment, in the present embodiment, the registration of the image forming apparatus with the CPS 104 is controlled according to conditions provided by the image forming apparatus, for example, whether or not a print protocol is supported. An example of control for the presence or absence of AirPrint support will be described as an example.

Figure 14:
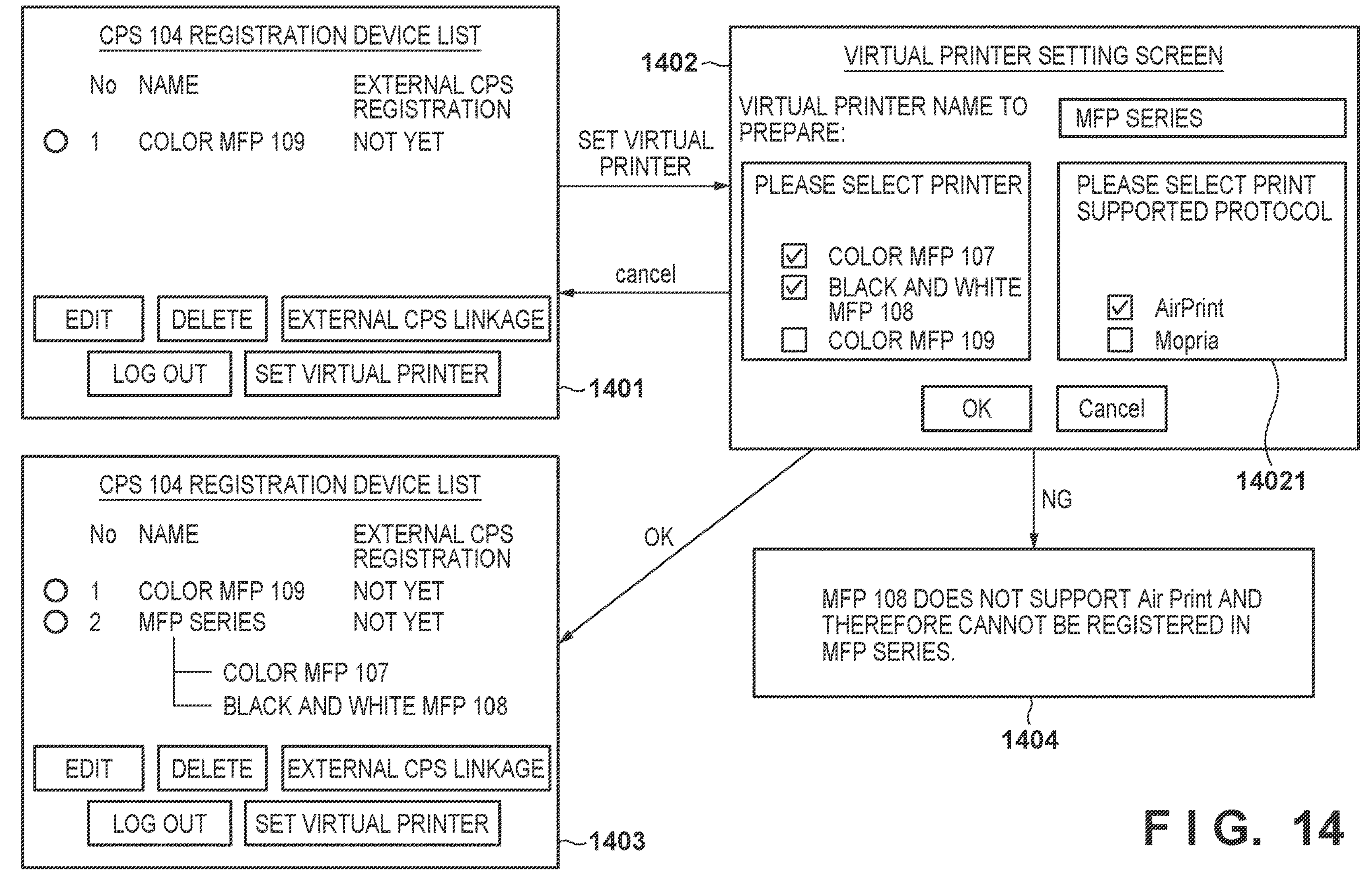
FIG. 14 is a virtual printer setting screen of the cloud printing service 104 in the second embodiment.

FIG. 13 is an example of a registration sequence for setting an image forming apparatus in the present embodiment as a virtual printer. In FIG. 6, the sequence is added to the flow in steps S605 to S606. FIG. 14 is an example of a virtual printer setting screen in the present embodiment generated by the page generation unit 403 and displayed on the client terminal.

First, the CPS 104 performs settings for registering a selected image forming apparatus to a selected virtual printer, from the client terminal. In a case where there is only one virtual printer in a tenant, it need not be selected. Preceding step S605, a screen for registration is obtained from the CPS 104. At this time, as shown in a screen 1401 of FIG. 14, the user selects an image forming apparatus to be registered and touches the virtual printer setting button. A virtual printer are also selected as necessary. A screen 1402 of FIG. 14 is then displayed accordingly. The screen 1402 includes a list of image forming apparatuses registered in the selected virtual printer, and a selection unit 14021 for selecting print protocols supported by the image forming apparatus to be registered. On this screen, a checkmark is given to already registered image forming apparatuses, and a check box of the image forming apparatus to be newly registered is blank.

In this embodiment, AirPrint is selected as a print protocol supported by the image forming apparatus to be registered. When an OK button is touched, a virtual printer setting request is transmitted to the CPS 104 (step S605).

The CPS 104, after receiving the request, refers to the setting DB 407 by the control unit 402 and confirms whether the image forming apparatus selected in step S605 includes an AirPrint property in the capability information (step S1301). In a case where an image forming apparatus to be registered includes an AirPrint property (AAP) as do the image forming apparatuses 107 and 109 of FIG. 8, the image forming apparatus selected for the virtual printer is set and registered in the setting DB 407. The registration completion notification is then transmitted to the client (step S606). The client, after receiving the notification, displays a screen indicating that the image forming apparatus to be registered has been registered in the virtual printer, as shown in a screen 1403 of FIG. 14.

In a case where the capability information of the image forming apparatus to be registered does not include an AirPrint property, the CPS 104 notifies the client that the registration of the virtual printer has failed, as shown in a screen 1404. The notification may indicate that the registration target image forming apparatus does not support the selected protocol as the reason for the failure. Note, in a case where a plurality of image forming apparatuses are to be registered and some of them are registered and the rest fail to be registered, the screen 1403 and the screen 1404 may be transmitted to the client and displayed.

Figure 15:
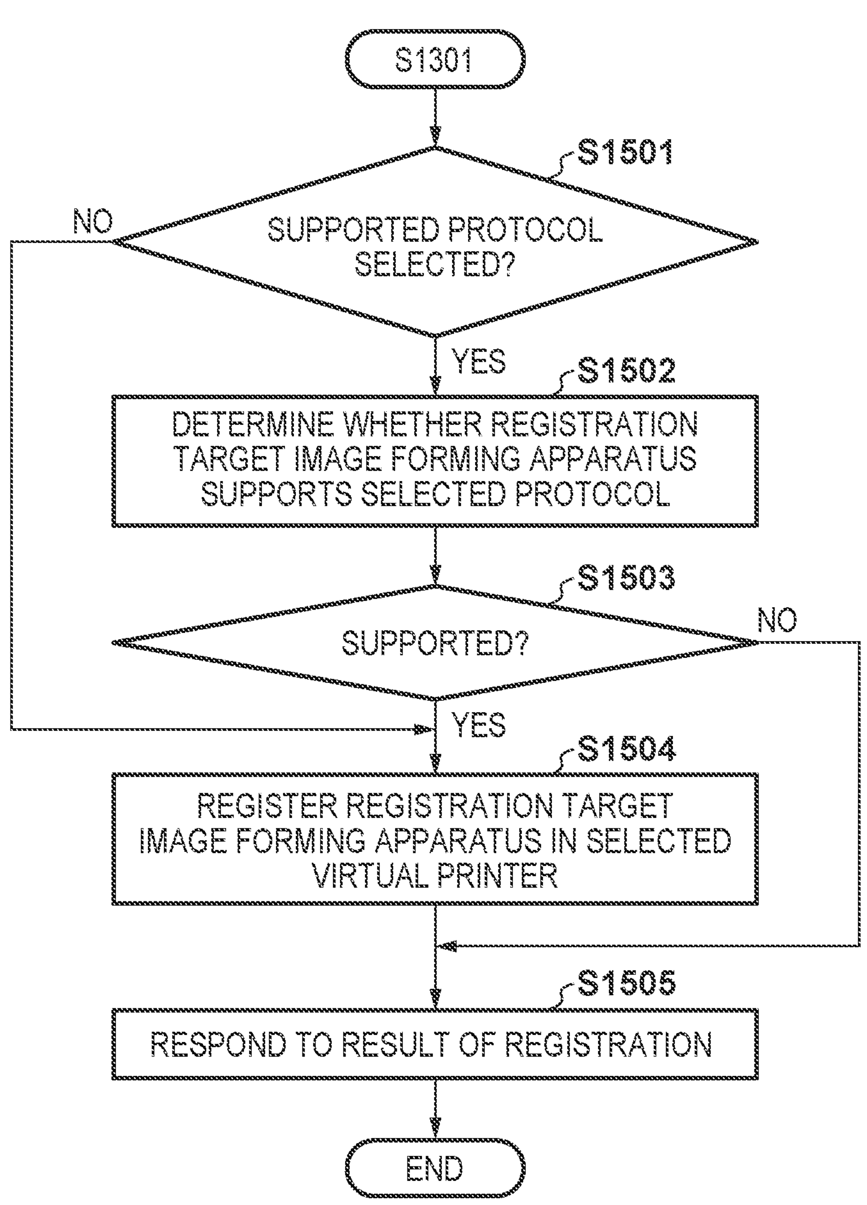
FIG. 15 is a flowchart of a procedure for determining that the image forming apparatus satisfies the condition in the second embodiment.

FIG. 15 shows the details of step S1301. The CPS 104 that has received the virtual printer registration request determines whether a supported protocol included in the received request is selected (step S1501). If a supported protocol is selected, it is determined whether the image forming apparatus to be registered supports the selected protocol by referring to the management table (step S1502). If the apparatus supports the protocol (step S1503—YES), the image forming apparatus to be registered is registered in the selected virtual printer (step S1504). If the apparatus does not support the protocol (step S1503—NO), the registration is skipped. In addition, if a supported protocol is not selected (step S1501—NO), the image forming apparatus to be registered is registered in the selected virtual printers. Finally, the result of the registration request is returned to the requestor (S1505).

Note that although FIG. 15 illustrates one image forming apparatus to be registered, in a case where there are a plurality of image forming apparatuses, steps S1502 to S1504 may be performed for each image forming apparatus and the result thereof may be returned in step S1505.

Therefore, a virtual printer in which only image forming apparatuses supporting a selected protocol are associated with each other can be configured. All of the image forming apparatuses associated with the virtual printer satisfy the condition of supporting the selected protocol. Therefore, printing in the printing system of the present embodiment is executed by the sequences of FIG. 9 and FIG. 11 of the first embodiment, but step S912 of FIG. 9 and step S1113 of FIG. 11 need not be performed.

Also, a virtual printer in which only image forming apparatuses that support the selected protocol are bundled with each other can be configured. As a result, printing using an image forming apparatus satisfying a given condition can be performed, and the capabilities of the image forming apparatuses can be effectively utilized.

As described above, when a virtual printer is registered, it is possible to prevent image forming apparatuses that both support and do not support AirPrint from being associated with one virtual printer in a mixed manner.

When printing is performed using a virtual printer with such a configuration, the client obtains information of a virtual printer that can be used directly from the CPS 104 or via an external CPS. Then, the client terminal transmits a print job to a virtual printer selected from thereamong. At this time, the information of a virtual printer that does not satisfy the condition need not be presented to the user. For example, a client who intends to transmit a print job by AirPrint refers to the capability information of the virtual printers and presents only virtual printers that support AirPrint to the user as useable virtual printers. Then, the user may be allowed to select the virtual printer to use from among those presented to the user.

Therefore, printing can be appropriately performed using the supported printing protocol.

In this way, even in a printing system in which printing is performed using a virtual printer in which a plurality of image forming apparatuses are associated with each other, printing using an image forming apparatus suitable for a print job can be performed.

Furthermore, the convenience of bundling a plurality of image forming apparatuses into a single virtual printer is not impaired.

Also, a user who intends to execute printing by an image forming apparatus may download and execute a print job that can be received by the image forming apparatus, so that the convenience of the cloud printing service is not impaired.

Note, in the second embodiment, the capability information of the virtual printer may be the sum of the capability information of the image forming apparatuses associated with the virtual printer (that is, the maximum capability for each item), or may be a common portion of the capability information (that is, the minimum capability for each item).

[Modification of Second Embodiment]

In a case where the capability information of an image forming apparatus associated with the virtual printer is changed after the association and the predetermined condition ceases to be satisfied, the registration of the image forming apparatus may be deleted from the virtual printer. For example, in a case where a setting of an image forming apparatus is changed and capability information is changed, the image forming apparatus notifies the CPS 104 of the change. The CPS 104, after receiving the notification, determines from the capability information change whether a condition to be satisfied by the image forming apparatus, for example, a condition set in the virtual printer to which the image forming apparatus is associated, continues to be satisfied. An example of such a condition is support for a protocol such as AirPrint and Mopria. When a condition associated with the virtual printer ceases to be satisfied, the registration of the image forming apparatus is deleted from the virtual printer, and the association between the virtual printer and the image forming apparatus is cancelled.

At this time, if a print job obtained from the CPS 104 remains in the image forming apparatus, the print job may end up being executed by the image forming apparatus even though it does not satisfy the condition for executing the print job. Therefore, configuration may be taken so that, if there remains a print job obtained from the CPS 104 in the image forming apparatus, changing a setting related to the capability information is not allowed.

Further, configuration may be such that when an image forming apparatus is set to be associated with a virtual printer, if it is not possible to determine whether the image forming apparatus has a given condition, for example, supports AirPrint, the association is not performed. Alternatively, in such a case, the image forming apparatus is first provisionally associated with a virtual printer, and when it is determine whether or not AirPrint is supported, formally registration or registration deletion may be performed. In this case, in the provisional registration state, the print job is not transferred to the image forming apparatus.

In the second embodiment, an example is described in which a virtual printer that supports AirPrint is configured. The print protocol may also be, for example, Mopria. Therefore, if such protocols are made to be selectable, a virtual printer with the following capabilities can be configured, and image forming apparatuses can be associated.

1. AirPrint/Mopria Both Supported
2. AirPrint Supported, Mopria Not Supported
3. AirPrint Not Supported, Mopria Supported
4. AirPrint/Mopria Both Not Supported In a case where a single image forming apparatus is allowed to be duplicatively registered to a plurality of virtual printers, a virtual printer having three types of capabilities, i.e., neither AirPrint nor Mopria supported, AirPrint supported, and Mopria supported may be configured. In this case, an image forming apparatus that supports both AirPrint and Mopria is redundantly associated with a virtual printer that supports AirPrint and a virtual printers that supports Mopria.

The above is not limited to AirPrint and Mopria, and other print protocols that can be set in the image forming apparatus can be conditions for registration to a virtual printer in a similar manner. Further, the condition is not limited to including a printing protocol, and may be another capability. For example, the capability of color printing may be set as a condition for associating an image forming apparatus with a virtual printer. In this case, for example, the virtual printer is set to support color printing as a condition. Then, only image forming apparatuses in which the capability information indicates color printing support are allowed to be associated. By doing so, it is possible to configure a virtual printer in which all the associated image forming apparatuses support color.

When the user performs printing, the user obtains information of available virtual printers from a CPS connected to the client, and transmits a print job to a virtual printer selected from among them. At this time, a condition for a virtual printer to be a candidate, for example, color printing support, may be set and virtual printers that satisfy this condition may be presented to the user as candidate virtual printers to be used. The condition may be set by the user on a screen that displays the candidate virtual printers.

Note, in the first embodiment, it is determined whether the print job is a print job that requires the image forming apparatus to satisfy a specific condition. Therefore, for example, in a case where a condition other than the printing protocol is applied to the first embodiment, it may be determined whether or not a print job is an applicable print job by referring to a setting of the print job. For example, in the above-described color printing support, the CPS 104 may refer to the color setting included in the print job, and if a color setting is included, determine that the print job requires that the image forming apparatus that is to execute the color setting supports color printing. The presence of the print job may be notified only to an image forming apparatus that supports color printing among the image forming apparatuses associated with the virtual printer that received the print job.

As described above, the above first and second embodiments and modifications thereof can be applied not only to the printing protocol but also to other capabilities.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2022-161206, filed Oct. 5, 2022 which is hereby incorporated by reference herein in its entirety.

What is claimed is:

1. An information processing apparatus, comprising:

at least one memory that stores at least one program; and at least one processor, the at least one program causing the at least one processor to perform:

configuring a virtual printer associated with one or a plurality of image forming apparatuses;

storing and managing capability information indicating a capability of each of the one or the plurality of image forming apparatuses associated with the virtual printer;

determining, when a print job for the virtual printer is received, whether or not the print job is a conditional print job to be executed by an image forming apparatus that satisfies a predetermined condition;

in a case where the print job is determined to be the conditional print job, referencing the capability information and specifying an image forming apparatus that satisfies the predetermined condition from among the one or the plurality of image forming apparatuses associated with the virtual printer; and transmitting the conditional print job to the image forming apparatus that satisfies the predetermined condition.

2. The information processing apparatus according to claim 1, wherein the transmitting, in accordance with an obtainment request from an image forming apparatus, among the one or the plurality of image forming apparatuses associated with the virtual printer, which satisfies the predetermined condition, transmits the conditional print job to the image forming apparatus which satisfies the predetermined condition, and, in accordance with an obtainment request from an image forming apparatus which does not satisfy the predetermined condition, does not transmit the conditional print job to the image forming apparatus which does not satisfy the predetermined condition.

3. The information processing apparatus according to claim 1, wherein the determining determines whether or not the print job is the conditional print job based on a property included in the print job.

4. The information processing apparatus according to claim 1, wherein a sum of the capability information of the one or the plurality of image forming apparatuses associated with the virtual printer is set as the capability information of the virtual printer, and the set capability information is presented to a transmission source of a print job as the capability information of the virtual printer.

5. The information processing apparatus according to claim 1, wherein the configuring associates an image forming apparatus that satisfies a condition set in the virtual printer with the virtual printer and does not associate an image forming apparatus that does not satisfy the condition set in the virtual printer with the virtual printer.

6. An information processing apparatus, comprising:

at least one memory that stores at least one program; and at least one processor, the at least one program causing the at least one processor to perform:

configuring a virtual printer associated with one or a plurality of image forming apparatuses;

storing and managing capability information indicating a capability of each of the one or the plurality of image forming apparatuses associated with the virtual printer;

transmitting, when a print job for the virtual printer is received, the print job to one image forming apparatus among the one or the plurality of the image forming apparatuses, wherein the configuring associates a first image forming apparatus having a first capability, utilized by the first image forming apparatus when the first image forming apparatus performs a printing operation, that satisfies a condition set in the virtual printer with the virtual printer and does not associate a second image forming apparatus having a second capability, utilized by the second image forming apparatus when the second image forming apparatus performs a printing operation, that does not satisfy the condition set in the virtual printer with the virtual printer.

7. The information processing apparatus according to claim 6, wherein the transmitting, in accordance with an obtainment request from one image forming apparatus among the one or the plurality of image forming apparatuses associated with the virtual printer, transmits the print job to the one image forming apparatus which the obtainment request is from.

8. The information processing apparatus according to claim 6, wherein the at least one program causing the at least one processor to perform:

setting the condition to the virtual printer.

9. The information processing apparatus according to claim 6, wherein a sum or a common portion of the capability information of the one or the plurality of image forming apparatuses associated with the virtual printer is set as the capability information of the virtual printer, and the set capability information is presented to a transmission source of a print job as the capability information of the virtual printer.

10. The information processing apparatus according to claim 6, wherein the configuring, in a case where a setting of the capability information of one image forming apparatus of the one or the plurality of image forming apparatuses associated with the virtual printer is changed and the condition set to the virtual printer ceases to be satisfied, cancels the association with the virtual printer of the one image forming apparatus having the changed setting of the capability information.

11. The information processing apparatus according to claim 6, wherein the set condition is a combination of a plurality of conditions.

12. The information processing apparatus according to claim 1, wherein the condition includes that the image forming apparatus supports a particular protocol.

13. The information processing apparatus according to claim 12, wherein the predetermined protocol includes AirPrint or Mopria.

14. A non-transitory computer-readable medium storing thereon a program which, when loaded into a computer and executed, causes the computer to execute a process, the process comprising:

configuring a virtual printer associated with one or a plurality of image forming apparatuses;

storing and managing capability information indicating a capability of each of the one or the plurality of image forming apparatuses associated with the virtual printer;

determining, when a print job for the virtual printer is received, whether or not the print job is a conditional print job to be executed by an image forming apparatus that satisfies a predetermined condition;

in a case where the print job is determined to be the conditional print job, referencing the capability information and specifying an image forming apparatus that satisfies the predetermined condition from among the one or the plurality of image forming apparatuses associated with the virtual printer; and transmitting the conditional print job to the image forming apparatus that satisfies the predetermined condition.

15. A non-transitory computer-readable medium storing thereon a program which, when loaded into a computer and executed, causes the computer to execute a process, the process comprising:

configuring a virtual printer associated with one or a plurality of image forming apparatuses;

storing and managing capability information indicating a capability of each of the one or the plurality of image forming apparatuses associated with the virtual printer;

transmitting, when a print job for the virtual printer is received, the print job to one image forming apparatus among the one or the plurality of the image forming apparatuses;

associating a first image forming apparatus having a first capability, utilized by the first image forming apparatus when the first image forming apparatus performs a printing operation, that satisfies a condition set in the virtual printer with the virtual printer and not associating a second image forming apparatus having a second capability, utilized by the second image forming apparatus when the second image forming apparatus performs a printing operation, that does not satisfy the condition set in the virtual printer with the virtual printer.

16. A printing system, comprising:

an information processing apparatus;

one or a plurality of image forming apparatuses connected to the information processing apparatus; and a client terminal connected to the information processing apparatus through or not through a cloud printing service, wherein the information processing apparatus comprises at least one memory that stores at least one program; and at least one processor, the at least one program causing the at least one processor to perform:

configure a virtual printer associated with one or a plurality of image forming apparatuses;

store and manage capability information indicating a capability of each of the one or the plurality of image forming apparatuses associated with the virtual printer;

determine, when a print job for the virtual printer is received, whether or not the print job is a conditional print job to be executed by an image forming apparatus that satisfies a predetermined condition;

in a case where the print job is determined to be the conditional print job, reference the capability information and specify an image forming apparatus that satisfies the predetermined condition from among the one or the plurality of image forming apparatuses associated with the virtual printer; and transmit the conditional print job to the image forming apparatus that satisfies the predetermined condition.

17. A printing system, comprising:

an information processing apparatus;

one or a plurality of image forming apparatuses connected to the information processing apparatus; and a client terminal connected to the information processing apparatus through or not through a cloud printing service, wherein the information processing apparatus comprises at least one memory that stores at least one program; and at least one processor, the at least one program causing the at least one processor to perform:

configure a virtual printer associated with one or a plurality of image forming apparatuses;

store and manage capability information indicating a capability of each of the one or a plurality of image forming apparatuses associated with the virtual printer; and transmit, when a print job for the virtual printer is received, the print job to one image forming apparatus among the one or a plurality of the image forming apparatuses, wherein a first image forming apparatus having a first capability, utilized by the first image forming apparatus when the first image forming apparatus performs a printing operation, that satisfies a condition set in the virtual printer is associated with the virtual printer and a second image forming apparatus having a second capability, utilized by the second image forming apparatus when the second image forming apparatus performs a printing operation, that does not satisfy the condition set in the virtual printer is not associated with the virtual printer.

18. The printing system according to claim 16, wherein a protocol between the information processing apparatus and the one or a plurality of image forming apparatuses is different from a protocol between the information processing apparatus and the cloud printing service.

19. A print control method executed by an information processing apparatus, comprising:

configuring a virtual printer associated with one or a plurality of image forming apparatuses;

storing and managing capability information indicating a capability of each of the one or the plurality of image forming apparatuses associated with the virtual printer;

determining, when a print job for the virtual printer is received, whether or not the print job is a conditional print job to be executed by an image forming apparatus that satisfies a predetermined condition;

in a case where the print job is determined to be the conditional print job, referencing the capability information and specifying an image forming apparatus that satisfies the predetermined condition from among the one or the plurality of image forming apparatuses associated with the virtual printer; and transmitting the conditional print job to the image forming apparatus that satisfies the predetermined condition.

20. A print control method executed by an information processing apparatus, comprising:

configuring a virtual printer associated with one or a plurality of image forming apparatuses;

storing and managing capability information indicating a capability of each of the one or a plurality of image forming apparatuses associated with the virtual printer;

transmitting, when a print job for the virtual printer is received, the print job to one image forming apparatus among the one or a plurality of the image forming apparatuses;

associating a first image forming apparatus having a first capability, utilized by the first image forming apparatus when the first image forming apparatus performs a printing operation, that satisfies a condition set in the virtual printer with the virtual printer and not associating a second image forming apparatus having a second capability, utilized by the second image forming apparatus when the second image forming apparatus performs a printing operation, that does not satisfy the condition set in the virtual printer with the virtual printer.

* * * * *